United States Patent
Esser

(10) Patent No.: US 7,967,031 B2
(45) Date of Patent: Jun. 28, 2011

(54) DELIVERY PIPE FOR THE TRANSPORT OF SOLIDS

(75) Inventor: Alexander Esser, Warstein (DE)

(73) Assignee: Esser-Werke GmbH & Co.KG, Warstein (DE)

( * ) Notice: Subject to any disclaimer, the term of this patent is extended or adjusted under 35 U.S.C. 154(b) by 203 days.

(21) Appl. No.: 12/374,596

(22) PCT Filed: Aug. 3, 2007

(86) PCT No.: PCT/DE2007/001385
§ 371 (c)(1),
(2), (4) Date: Jan. 21, 2009

(87) PCT Pub. No.: WO2008/022616
PCT Pub. Date: Feb. 28, 2008

(65) Prior Publication Data
US 2009/0308480 A1 Dec. 17, 2009

(30) Foreign Application Priority Data
Aug. 21, 2006 (DE) .......................... 10 2006 038 989

(51) Int. Cl.
F16L 9/04 (2006.01)
(52) U.S. Cl. .......... 138/109; 138/155; 138/172; 285/16; 285/55
(58) Field of Classification Search .................. 138/109, 138/172, 177, 155; 285/55, 416, 16, 179, 285/286; 406/193
See application file for complete search history.

(56) References Cited

U.S. PATENT DOCUMENTS

| 5,044,670 A * | 9/1991 | Esser ............................. 285/16 |
| 5,275,440 A * | 1/1994 | Esser ............................. 285/16 |
| 5,379,805 A * | 1/1995 | Klemm et al. ................ 138/109 |
| 5,718,461 A * | 2/1998 | Esser ........................... 285/179 |
| 5,813,437 A * | 9/1998 | Esser ........................... 138/109 |
| 6,325,106 B1 * | 12/2001 | Esser .......................... 138/96 T |
| 6,494,234 B2 * | 12/2002 | Esser .......................... 138/109 |
| 6,520,211 B1 | 2/2003 | Esser |
| 6,520,213 B1 * | 2/2003 | Esser .......................... 138/109 |

FOREIGN PATENT DOCUMENTS

| DE | 197 35 335 A1 | 5/1999 |
| DE | 198 09 529 A1 | 9/1999 |
| EP | 1 653 140 A1 | 5/2006 |

* cited by examiner

Primary Examiner — Patrick F Brinson
(74) Attorney, Agent, or Firm — Henry M. Feiereisen; Ursula B. Day

(57) ABSTRACT

A delivery pipe (1) for the transport of solids is described. The delivery pipe (1) has a double-layer pipe body (2) which has a coupling collar (7, 8) on the inlet-side pipe end (5) and on the outlet-side pipe end (6). A first wear ring (9) and a second wear ring (10) are provided in succession in the longitudinal direction of the pipe body (2) in the region of the inlet-side coupling collar (7). The second inner wear ring (10) has a length (L) which is sized greater than or equal to half the internal diameter ($I_D$) of the pipe body (2). As a result, wear phenomena can be reduced in the inlet-side region of the delivery pipe (1) and the service life of the delivery pipe (1) can be increased considerably.

21 Claims, 1 Drawing Sheet

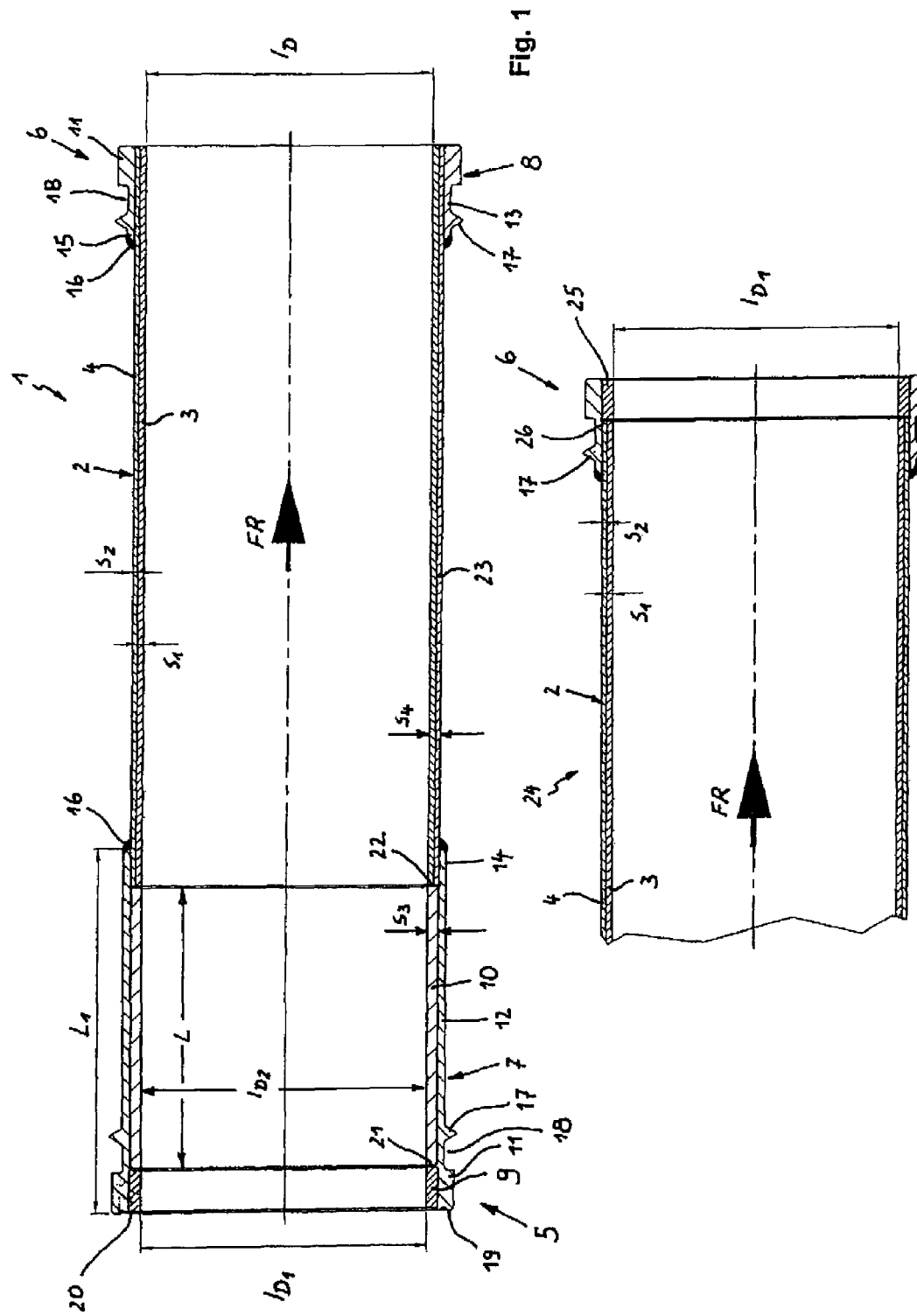

DELIVERY PIPE FOR THE TRANSPORT OF SOLIDS

BACKGROUND OF THE INVENTION

The invention relates to a delivery pipe for the transport of solids.

Such a delivery pipe is part of the state of the art as disclosed by, e.g., DE 198 09 529 C2. This delivery pipe has two wear rings arranged in succession in the region of the coupling collar on the inlet side.

Delivery pipes are widely used in the pipeline of concrete-distribution rigs of mobile concrete pumps. Besides the pumping capacity and delivery rate of the pump, important criteria of a mobile concrete pump are the reach height and/or the reaching area of the distributor rig, and here, in turn, a great wear resistance of the pipeline.

Naturally, in operation, the delivery pipes are subject to wear phenomena. Increased wear is observed in particular on the inlet side of the pipe body of a delivery pipe. This wear is disproportionately higher than the wear in the remaining area of a delivery pipe.

In order to reduce the wear on the inlet-side end of the delivery pipe, DE 197 35 335 C2 provides on the inlet-side end for a coupling collar which is wider than the coupling collar arranged on the outlet-side end.

EP 1 653 140 A1 discloses a double-layer delivery pipe with integrated wear rings at the pipe ends.

SUMMARY OF THE INVENTION

In view of the prior art, it is an object of the invention to provide a delivery pipe for the transport of solids that has an increased service life.

This object is solved in accordance with the invention by a delivery pipe for the transport of solids having a pipe body which includes on each of its inlet-side pipe end and outlet-side pipe end a respective coupling collar, wherein a first wear ring and a second wear ring are provided in succession in the longitudinal direction of the pipe body in the region of the inlet-side coupling collar, wherein the second inner wear ring has a length which is sized greater than or equal to half the inner diameter of the pipe body.

The delivery pipe includes a pipe body which is equipped on both sides with coupling collars. The coupling collars permit the delivery pipes to be assembled to a pipeline, whereby an exchange of individual delivery pipes of the otherwise closed pipeline is also possible. In the region of the inlet-side coupling collar, a first wear ring and a second wear ring are arranged in succession in the longitudinal direction of the pipe body. The essence of the invention resides in the configuration of the second inner wear ring of a length which is greater than or equal to half the inner diameter of the pipe body. As a result, wear phenomena on the inlet side can be reduced or sufficiently minimized so that the wear in the zone of the second wear ring equals about the wear that occurs in the remaining pipe body, when viewed in the delivery direction. This is accomplished by the second wear ring whose length equals at least half the inner diameter of the pipe body or whose length is greater than that. The use of the delivery pipe in accordance with the invention is tied to the delivery direction. The second wear ring is sized long enough so that turbulences formed on the inlet side as a result of slurry of the transported material advanced at the inner perimeter being sheared off at the transition between two delivery pipes have calmed down again within the zone of the second wear ring. By and large, the average service life of a delivery pipe can thus be significantly increased.

The inlet-side coupling collar is sized accordingly long enough to receive the first wear ring and the second wear ring and to ensure a reliable securement on the pipe body.

In practice, experiments have shown that the second wear ring should have a length of at least 80 mm. As a result, the function of the second wear ring sought in accordance with the invention is reliably realized.

Preferably, the second wear ring is made of steel, in particular hardened steel. The first wear ring that is arranged at the opening side of the delivery pipe is made of wear-resistant and impact-resistant material, e.g. a ceramic wear material, a chromium carbide cast, or a martensitic nickel-containing wear-resistant cast iron. Thus, the first wear ring and the second wear ring are made of different materials.

The inner diameter of the first wear ring is sized smaller than the inner diameter of the second wear ring. The inner diameter of the second wear ring, in turn, is sized smaller than the inner diameter of the pipe body. As a result, when viewed from the inlet side, the inner diameter of the delivery pipe increases starting from the first wear ring via the second wear ring and towards the pipe body so that no protruding edges are present in the delivery direction. This measure supports laminar flow patterns within the pipeline and contributes to wear reduction.

The delivery pipe according to the invention can be embodied as a one-layer pipe and, particularly advantageously, as a double-layer pipe. In the double-layer embodiment of the delivery pipe, the delivery pipe includes a highly wear-resistant, hardened inner pipe and a pressure-resistant outer pipe. The inner pipe made of hardened steel should oppose the solid to be transported with a wear resistance that is as long and high as possible. The outer pipe is softer and more shock-resistant than the inner pipe. This is advantageous in particular in view of the transport and the assembly and disassembly processes since delivery pipes are usually subject to rough handling.

The outer pipe functions as an envelope in terms of shock and impact protection. Hereby, it is sufficient to design the outer pipe as a thin-walled pipe. The inner pipe and the second wear ring are advantageously made of the same material. The wall thickness of the second wear ring should hereby correspond to the wall thickness of the pipe body. Preferably, the second wear ring has a wall thickness that is at least 30%, preferably 100%, thicker than the wall thickness of the inner pipe.

A sealing is integrated between the second wear ring and the pipe body.

With respect to the assembly, it is advantageous to provide a circumferential rim at the inner perimeter of the inlet-side coupling collar. This rim serves as a stop for positioning the first wear ring and the second wear ring within the coupling collar. The first wear ring and the second wear ring are each inserted into the coupling collar from opposite open sides of the coupling collar and then come in contact at the rim.

Provided on the end face of the inlet-side coupling collar is a radially inwardly directed circumferential collar. As a result, the first wear ring is fixed in place in the coupling collar. In practice, the collar is produced by material displacement and/or material compression of the end face of the coupling collar.

Using the first wear ring and the long second wear ring on the inlet-side end of the pipe body allows for a significantly improved delivery pipe in terms of its service life. Additionally, a wear ring can also be provided on the outlet-side end of the pipe body in order to counter possible wearing phenomena at the outlet-side end of the delivery pipe. In general, the delivery pipe in accordance with the invention may be provided, however, without a wear ring on the outlet-side end of the pipe body. This contributes to a cost compensation for the added costs that are incurred by the provision of the long second wear ring on the inlet side in accordance with the invention.

A practical further improvement of the delivery pipe in accordance with the invention can be realized by providing a layer of heat-insulating material between the inner pipe and the outer pipe. This heat-insulating layer between the inner pipe and the outer pipe ensures that adverse heat influences are kept away from the inner pipe during subsequent welding operations, e.g., for securing the coupling collars.

Preferably, the layer between the inner pipe and the outer pipe is formed by a coating of a combustible non-metallic material that is applied to the outer surface of the inner pipe and/or the inner surface of the outer pipe. An anti-rust paint can hereby be applied to the outer surface of the inner pipe. The anti-rust paint burns as the double-layer pipe is hardened and forms the desired separating layer between the inner pipe and the outer pipe.

BRIEF DESCRIPTION OF THE DRAWING

Exemplary embodiments of the invention will now be described with reference to the drawings. It is shown in:

FIG. 1 a longitudinal section of a delivery pipe in accordance with the invention, and FIG. 2 the outlet-side end of a second embodiment of a delivery pipe in accordance with the invention.

DETAILED DESCRIPTION OF PREFERRED EMBODIMENTS

Arrow FR designates the delivery direction in each of FIGS. 1 and 2.

FIG. 1 shows a delivery pipe 1 that has a double-layer pipe body 2 which includes a highly wear-resistant, hardened inner pipe 3 and a pressure-resistant outer pipe 4. The wall thickness of the inner pipe 3 is referenced with $s_1$, the wall thickness of the outer pipe 4 is referenced with $s_2$. It can be seen that the wall thickness $s_1$ of the inner pipe 3 is greater than the wall thickness $s_2$ of the outer pipe 4.

Coupling collars 7 and 8 are secured on the inlet-side pipe end 5 and the outlet-side pipe end 6, respectively. Received in the inlet-side coupling collar 7 are a first wear ring 9 and a second wear ring 10 arranged in succession in the longitudinal direction of the pipe body 2. The first wearing material 9 is made of wear-resistant and impact-resistant material, such as a ceramic material, a chromium carbide cast, a martensitic nickel-containing wear-resistant cast iron (Ni-hard), or similar wearing materials. The second wear ring 10 is made of hardened steel and has a length L that is greater than or equal to half the inner diameter $I_D$ of the pipe body 2. For example, when the inner diameter $I_D$ of the pipe body 2 is 125 mm, the length L of the second wear ring 10 is at least 62.5 mm. In practice, the length L of the second wearing 10 is preferably 80 mm or more.

Both the coupling collar 7 and the coupling collar 8 have a flange 11 on their end face and a fitting 12, 13 that extends in the direction towards the pipe body 2. Each fitting 12, 13 overlaps the pipe end 5, 6 of the pipe body, respectively, and is with its end section 14, 15, respectively, welded to the outer surface of the outer pipe 4 via a welding seam 16. A spacer ring 17 whose cross-section is triangular is provided at the outer surface of each fitting 12, 13 at a distance to the terminal flange 11. The outer diameter of the spacer ring 17 is sized greater than the outer diameter of the flange 11 so that the tip of spacer ring 17 protrudes slightly beyond the flange 11. In this manner, stacked delivery pipes touch each other only at certain points. In this way, damage to a lacquered surface of the delivery pipes 1 is prevented or reduced.

A coupling groove 18 is defined between the flange 11 and the spacer ring 17. A clamp, not shown here, engages the coupling groove 18 for coupling the delivery pipes 1 so as to form a pipeline.

The first wear ring 9 is sized short and extends in the longitudinal area of the flange 11. The second wear ring 10 is sized longer and has, as mentioned above, a length L that is at least half the inner diameter $I_D$ of the pipe body 2. Accordingly, the length $L_1$ of the coupling collar 7 is dimensioned such that the first wear ring 9 and the second wear ring 10 are received in the coupling collar 7, with the end section 14 of the coupling collar 7 overlapping the pipe body 2.

The inner diameter $I_{D1}$ of the first wear ring 9 is sized smaller than the inner diameter $I_{D2}$ of the second wear ring 10, whereas the inner diameter $I_{D2}$ of the second wear ring 10, in turn, is sized smaller than the inner diameter $I_D$ of the pipe body 2. As a result, the inner diameter of the delivery pipe 1 increases starting from the first wear ring 9, via the second wear ring 10, towards the pipe body 2. Thus, when viewed in the delivery direction FR, protruding edges can be avoided, thereby assisting in the formation of laminar flow patterns within the pipeline and contributing to wear reduction.

The wall thickness $s_3$ of the second wear ring 10 approximately corresponds to the wall thickness $s_4$ of the pipe body 2.

A radially inwardly directed circumferential collar 20 is provided on the end face 19 of the coupling collar 7. This circumferential collar is produced by material compression on the end face 19. The collar 20 forms a stop and secures the first wear ring 9 on the front side. In addition, a circumferential rim 21 is provided at the inner perimeter of the inlet-side coupling collar 7, wherein the circumferential rim 21 is arranged between the first wear ring 9 and the second wear ring 10. The rim 21 defines a stop for the wear rings 9 and 10, respectively, which are mounted from the oppositely located openings, respectively, of the coupling collar 7. The second wear ring 10 can be bonded in the fitting 13 of the coupling collar 7. A sealing 22 is integrated between the second wear ring 10 and the pipe body 2.

A heat insulation layer 23 is located between the inner pipe 3 and the outer pipe 4. The layer 23 is made of a combustible non-metallic material, such as e.g. an anti-rust paint, which is applied to the outer surface of the inner pipe 3 before it is joined with the outer pipe 4. Subsequently, the inner pipe 3 is secured in the outer pipe 4 by at least one hardening process. The anti-rust paint burns hereby and forms the layer 23.

No wear ring is provided on the outlet-side pipe end 6 of the delivery pipe 1.

As can be seen in FIG. 2, the delivery pipe 24 differs from the delivery pipe 1 by the presence of a wear ring 25 of wear-resistant and impact-resistant material on the outlet-side pipe end 6. The wear ring is secured in the coupling collar 8 through intervention of a sealing 26 anteriorly of the pipe body 2. Otherwise, the delivery pipe 24 corresponds to the delivery pipe 1 so that a repeated explanation of its structure is omitted.

What is claimed is:

1. A delivery pipe for transporting solids, comprising:
   a pipe body defining a length axis and having a first inlet-side pipe end and a second outlet-side pipe end;
   a first coupling collar arranged at the first pipe end;

a second coupling collar arranged at the second pipe end; and first and second wear rings arranged in succession in a direction of the length axis in an area of the first pipe end to thereby define inner and outer wear rings, wherein the inner wear ring has a length which is at least equal to half an inner diameter of the pipe body, wherein the inner and outer wear rings are made of different materials.

2. The delivery pipe of claim 1, wherein the outer wear ring has an inner diameter which is smaller than an inner diameter of the inner wear ring.

3. The delivery pipe of claim 2, wherein the inner diameter of the inner wear ring is smaller than the inner diameter of the pipe body.

4. The delivery pipe of claim 1, wherein the inner wear ring has a wall thickness which corresponds to a wall thickness of the pipe body.

5. The delivery pipe of claim 1, further comprising a rim arranged at an inner perimeter of the first coupling collar between the outer wear ring and the inner wear ring.

6. The delivery pipe of claim 1, further comprising a circumferential collar arranged at an end face of the first coupling collar.

7. The delivery pipe of claim 1, characterized by an absence of a wear ring on the second pipe end of the pipe body.

8. The delivery pipe of claim 1, wherein the length of the inner wear ring is at least equal to 80 mm.

9. The delivery pipe of claim 1, wherein the inner wear ring is made of steel.

10. A delivery pipe for transporting solids, comprising:
a pipe body defining a length axis and having a first inlet-side pipe end and a second outlet-side pipe end;
a first coupling collar arranged at the first pipe end;
a second coupling collar arranged at the second pipe end;
first and second wear rings arranged in succession in a direction of the length axis in an area of the first pipe end to thereby define inner and outer wear rings, wherein the inner wear ring has a length which is at least equal to half an inner diameter of the pipe body; and
a sealing arranged between the inner wear ring and the pipe body.

11. A delivery pipe of for transporting solids, comprising:
a pipe body defining a length axis and having a first inlet-side pipe end and a second outlet-side pipe end;
a first coupling collar arranged at the first pipe end;
a second coupling collar arranged at the second pipe end;
first and second wear rings arranged in succession in a direction of the length axis in an area of the first pipe end to thereby define inner and outer wear rings, wherein the inner wear ring has a length which is at least equal to half an inner diameter of the pipe body; and
a third wear ring arranged on the second pipe end of the pipe body.

12. The delivery pipe of claim 11, wherein the length of the inner wear ring is at least equal to 80 mm.

13. The delivery pipe of claim 11, wherein the inner wear ring is made of steel.

14. The delivery pipe of claim 11, wherein the outer wear ring has an inner diameter which is smaller than an inner diameter of the inner wear ring.

15. The delivery pipe of claim 14, wherein the inner diameter of the inner wear ring is smaller than the inner diameter of the pipe body.

16. The delivery pipe of claim 11, wherein the inner wear ring has a wall thickness which corresponds to a wall thickness of the pipe body.

17. The delivery pipe of claim 11, further comprising a rim arranged at an inner perimeter of the first coupling collar between the outer wear ring and the inner wear ring.

18. The delivery pipe of claim 11, further comprising a circumferential collar arranged at an end face of the first coupling collar.

19. The delivery pipe of claim 11, characterized by an absence of a wear ring on the second pipe end of the pipe body.

20. A delivery pipe for transporting solids, comprising:
a pipe body defining a length axis and having a first inlet-side pipe end and a second outlet-side pipe end, said pipe body including an inner pipe and an outer pipe in surrounding relationship to the inner pipe;
a first coupling collar arranged at the first pipe end;
a second coupling collar arranged at the second pipe end;
first and second wear rings arranged in succession in a direction of the length axis in an area of the first pipe end to thereby define inner and outer wear rings, wherein the inner wear ring has a length which is at least equal to half an inner diameter of the pipe body; and
a layer made of a heat-insulating material arranged between the inner pipe and the outer pipe.

21. The delivery pipe of claim 20, wherein the layer between the inner pipe and the outer pipe is formed by a coat of combustible non-metallic material which is applied to at least one member selected from the group consisting of the outer surface of the inner pipe and the inner surface of the outer pipe.

* * * * *